US011951758B2

(12) United States Patent
Furuhata

(10) Patent No.: US 11,951,758 B2
(45) Date of Patent: Apr. 9, 2024

(54) PRINTING METHOD AND PRINTED PRODUCT

(71) Applicant: MIMAKI ENGINEERING CO., LTD., Nagano (JP)

(72) Inventor: Tomotaka Furuhata, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 659 days.

(21) Appl. No.: 17/089,732

(22) Filed: Nov. 5, 2020

(65) Prior Publication Data

US 2021/0053371 A1 Feb. 25, 2021

Related U.S. Application Data

(63) Continuation of application No. 14/443,395, filed as application No. PCT/JP2013/081554 on Nov. 22, 2013, now abandoned.

(30) Foreign Application Priority Data

Nov. 22, 2012 (JP) ................................ 2012-256890

(51) Int. Cl.
*B41M 5/00* (2006.01)
*B41J 11/00* (2006.01)
*B41M 7/00* (2006.01)
*D06P 5/30* (2006.01)

(52) U.S. Cl.
CPC ........ *B41M 5/0023* (2013.01); *B41M 5/0017* (2013.01); *B41M 5/0047* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609;
(Continued)

(56) References Cited

U.S. PATENT DOCUMENTS

2008/0068431 A1* 3/2008 Yokoyama ............... B41J 2/155 347/102
2011/0221818 A1* 9/2011 Furuhata ............ B41J 11/00214 347/16

(Continued)

*Primary Examiner* — Manish S Shah
(74) *Attorney, Agent, or Firm* — JCIPRNET

(57) ABSTRACT

The object is to obtain a printed product excellent in fastness to washing. To achieve the object, a printing method is provided. The printing method includes a forming step of forming a solvent UV ink layer (2) on a printing target object (1), a drying step of drying the solvent UV ink layer (2), a decorating step of forming a decorative layer (3) on the dried solvent UV ink layer (2), and a curing step of curing the decorated solvent UV ink layer (2) by irradiating the same with ultraviolet.

10 Claims, 1 Drawing Sheet

(52) U.S. Cl.
CPC ........... *B41J 11/00214* (2021.01); *B41M 7/00* (2013.01); *B41M 7/0081* (2013.01); *B41M 7/009* (2013.01); *D06P 5/30* (2013.01)

(58) Field of Classification Search
CPC ... B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

2012/0327147 A1* 12/2012 Okawa .................. B41J 2/2114 347/9
2015/0290951 A1* 10/2015 Furuhata .............. B41M 5/0017 347/104
2015/0292150 A1* 10/2015 Ikeda ........................ B32B 7/12 427/508

* cited by examiner

PRINTING METHOD AND PRINTED PRODUCT

CROSS-REFERENCE TO RELATED APPLICATION

This application is a continuation application of the U.S. patent application Ser. No. 14/443,395, filed on May 18, 2015, which is a 371 application of the International PCT application serial no. PCT/JP2013/081554, filed on Nov. 22, 2013, which claims the priority benefit of Japan Patent Application No. 2012-256890, filed on Nov. 22, 2012. The entirety of each of the above-mentioned patent applications is hereby incorporated by reference herein and made a part of this specification.

TECHNICAL FIELD

The invention relates to a printing method and a printed product.

BACKGROUND ART

The patent document 1 describes a method for forming a pattern layer on fabric such as woven fabric or knitted fabric. The method descried in the patent document 1 forms a pattern layer from a pigment-containing resin of ultraviolet curing type on a fibrous base material.

PRIOR ART DOCUMENT

Patent Document

Patent Document 1: Japanese Laid-Open Patent Application No. 2010-12777 (disclosed on Jan. 21, 2010).

SUMMARY OF THE INVENTION

Problems to be Solved by the Invention

However, there is a problem with the method described in the patent document 1 that since an ink of ultraviolet curing type is used to form a pattern layer on fabric, the fabric after the pattern layer is formed thereon has poor fastness to washing, possibly fading or blurring the pattern layer when the fabric is washed.

When subjecting the ink of ultraviolet curing type spread on the fabric to a decorating process, it is necessary to temporarily cure the ink to increase its viscosity before the decorating process, to prevent smearing of the ink of ultraviolet curing type. Yet, curing the ink of ultraviolet curing type is still very difficult to manage, in order to prevent smearing of the ink and attain a degree of viscosity that ensures enough stickiness for the decorating process.

The present invention has been accomplished to solve these problems. The invention has an object to provide a printed product excellent in fastness to washing, and a printing method for obtaining the printed product.

Solutions to the Problems

To solve the problems, a printing method according to the present invention includes a forming step of forming a solvent UV ink layer on a printing target object; a drying step of drying the solvent UV ink layer; a decorating step of adhering a decorative material on the dried solvent UV ink layer or forming a decorative layer containing the decorative material on the dried solvent UV ink layer; and a curing step of curing the decorated solvent UV ink layer by irradiating the same with ultraviolet.

According to the above configuration, the solvent UV ink layer formed on the printing target object is dried and then decorated. By drying the solvent UV ink layer, an organic solvent contained in the solvent UV ink layer is volatilized, thus viscosity of the solvent UV ink layer is increased. This can effectively prevent smearing of the solvent UV ink layer.

The dried solvent UV ink layer is then decorated in the decorating step. The solvent UV ink layer, though increased in viscosity by drying, is still uncured, and its stickiness is maintained. In the decorating step, therefore, the decorative material or the decorative layer containing the decorative material can be favorably securely adhered to the solvent UV ink layer. Therefore, an additional material, for example, primer, is unnecessary to make the decorative layer adhere to the solvent UV ink layer.

Lastly, the decorated solvent UV ink layer is cured by irradiating the same with ultraviolet to obtain a desired printed product. The printed product thus obtained is excellent in fastness to washing, and effectively preventing the printed pattern or decorative layer from fading or blurring even after repeated washes. This printing method is, therefore, advantageously suitable for printing patterns on clothes such as T-shirts desirably excellent in fastness to washing.

Preferably, in the drying step of the printing method according to the present invention, the solvent UV ink layer is preheated at a temperature between 40° C. and 60° C., and the preheated solvent UV ink layer is heated at a temperature between 35° C. and 55° C., and then the heated solvent UV ink layer is post-heated at a temperature between 40° C. and 60° C.

According to the above configuration, the solvent UV ink layer is dried by heating in the drying step. At this time, the solvent UV ink layer is heated at different temperatures in stages; preheating at a temperature between 40° C. and 60° C., heating at a temperature between 35° C. and 55° C., and post-heating at a temperature between 40° C. and 60° C.

The solvent UV ink layer can accordingly be prevented from smearing and suitably dried at the same time to a degree of viscosity that ensures enough stickiness for the decorating process.

Preferably, the forming step of the printing method according to the present invention forms the solvent UV ink layer from a solvent UV ink containing a resin of UV curing type and an organic solvent selected from the group consisting of ketones, alcohols, ethers, hydrocarbons, glycols, glycol ether acetates, glycol ethers, esters, and pyrrolidones.

According to the above configuration, the solvent UV ink layer is formed from the solvent UV ink containing the resin of UV curing type and the organic solvent selected from the group consisting of ketones, alcohols, ethers, hydrocarbons, glycols, glycol ether acetates, glycol ethers, esters, and pyrrolidones. This allows the dried but still uncured solvent UV ink layer to maintain a degree of stickiness necessary for the decorating process, while effectively preventing smearing of the solvent UV ink layer.

In the printing method according to the present invention, the solvent UV ink preferably contains the organic solvent by a weight percent equal to or greater than 50 wt. % and equal to or less than 99 wt. % of a total quantity of the ink composition.

According to the above configuration, the solvent UV ink layer is formed from the solvent UV ink preferably containing the organic solvent by a weight percent equal to or greater than 50 wt. % and equal to or less than 99 wt. % of a total quantity of the ink composition. This allows the dried but still uncured solvent UV ink layer to maintain a degree of stickiness necessary for the decorating process, while effectively preventing smearing of the solvent UV ink layer.

The printing method according to the present invention preferably uses fabric as the printing target object, whereby a fabric printed product excellent in fastness to washing can be favorably obtained. This printing method is, therefore, advantageously suitable for printing patterns on clothes such as T-shirts desirably excellent in fastness to washing.

A printed product according to the invention includes a solvent UV ink layer formed on a printing target object, wherein a decorative material is adhered to the solvent UV ink layer or a decorative layer containing the decorative material is formed on the solvent UV ink layer.

According to the above configuration, the printed product has the solvent UV ink layer formed in a desired shape by the solvent UV ink and further decorated with the decorative material. Such a printed product is advantageously less likely to smear, excellent in fastness to washing, and favorably decorated. Thus, a commercially valuable product printed with an elaborate pattern can be obtained.

Effects of the Invention

According to the invention, the solvent UV ink layer formed on the printing target object is dried and then decorated, and then cured by irradiating the same with ultraviolet. Therefore, a printed product excellent in fastness to washing can be obtained.

EMBODIMENT OF THE INVENTION

An embodiment of the invention is hereinafter described in detail.

[Printing Method]

A printing method according an embodiment of the invention includes a forming step of forming a solvent UV ink layer on a printing target object; a drying step of drying the solvent UV ink layer; a decorating step of adhering a decorative material to the dried solvent UV ink layer or forming a decorative layer containing the decorative material on the dried solvent UV ink layer; and a curing step of curing the decorated solvent UV ink layer by irradiating the same with ultraviolet.

The printing method according to the embodiment is hereinafter described referring to FIGS. 1A to 1D. FIGS. 1A to 1D are schematic drawings showing an outline of the printing method according to the embodiment.

[Forming Step]

Figure 1A:
FIGS. 1A to 1D are schematic drawings of a printing method according to an embodiment of the invention.

As illustrated in FIG. 1A, the forming step forms a solvent UV ink layer 2 on a printing target object 1. The solvent UV ink layer 2 may be formed by applying a solvent UV ink on the printing target object 1 in a desired shape. The solvent UV ink may be applied onto the printing target object 1 by, for example, an inkjet printing device.

[Solvent UV Ink]

The solvent UV ink is an ink containing a resin of UV curing type (resin of ultraviolet curing type) and an organic solvent, in which the resin of UV curing type is dissolved in the organic solvent. The solvent UV ink may further contain a pigment, a photopolymerization initiator, and/or a sensitizer.

[Resin of UV Curing Type]

The resin of UV curing type contained in the solvent UV ink may be one selected from monomers, oligomers, and polymers cured by polymerization. The resin of UV curing type may be any suitable one selected from the commercially available monomers, oligomers, and polymers.

Examples of the monomers, oligomers, and polymers cured by polymerization initiated by ultraviolet irradiation include cationically polymerizable materials, radically polymerizable materials, and mixtures of such materials. Any suitable one of the exemplified resins of ultraviolet curing type may be singly used, or two or more of them may be mixed and used.

In the solvent UV ink, the content of any suitable one selected from the monomers, oligomers, and polymers cured by polymerization initiated by ultraviolet irradiation is preferably equal to or greater than 3 wt. % and equal to or less than 90 wt. % of a total quantity of the ink composition. The content is more preferably equal to or greater than 5 wt. % and equal to or less than 30 wt. % of a total quantity of the ink composition. The solvent UV ink containing the resin of UV curing type by a weight percent in the range of values can be more favorably cured by ultraviolet irradiation.

[Organic Solvent]

The organic solvent contained in the solvent UV ink may be any suitable one selected from the UV-curing resin soluble materials that are volatilized by heat-drying the solvent UV ink. Examples of such an organic solvent include, but are not limited to, ketones, alcohols, ethers, hydrocarbons, glycols, glycol ether acetates, glycol ethers, esters, and pyrrolidones.

Examples of the ketones include acetone, methyl ethyl ketone, cyclohexanon, and 2-heptanone. Examples of the alcohols include methanol, ethanol, isopropanol, n-hexyl alcohol, isoheptyl alcohol, 2-ethylhexyl alcohol, n-octyl alcohol, 3-methyl-3-methoxybutanol, and 3-methoxybutanol.

Examples of the ethers include cellosolve and butyl cellosolve. Examples of the hydrocarbons include toluene, xylene, turpentine oil, limonene, industrial volatile oils, tetrahydronaphthalene, and decahydronaphthalene. Examples of the glycols include ethylene glycol, diethylene glycol, thiodiethylene glycol, triethylene glycol, propylene glycol, dipropylene glycol, and tripropylene glycol.

Examples of the glycol acetates include ethylene glycol monoethyl ether acetate, ethylene glycol monobutyl ether acetate, diethylene glycol monoethyl ether acetate, and diethylene glycol monobutyl ether acetate.

Examples of the glycol ethers include ethylene glycol monohexyl ether, ethylene glycol-2-ethylhexyl ether, ethylene glycol phenyl ether, propylene glycol monoethyl ether, propylene glycol propyl ether, propylene glycol monobutyl ether, diethylene glycol monomethyl ether, diethylene glycol monoethyl ether, diethylene glycol monobutyl ether, diethylene glycol hexyl ether, diethylene glycol-2-ethylhexyl ether, dipropylene glycol monomethyl ether, dipropylene glycol monoethyl ether, dipropylene glycol monobutyl ether, dipropylene glycol propyl ether, triethylene glycol monomethyl ether, triethylene glycol monoethyl ether, triethylene glycol monobutyl ether, and tripropylene glycol monomethyl ether.

Examples of the esters include 2,2,4-trimethyl-1,3-pentanediol monoisobutyrate, triethylene glycol di(2-ethyl butyrate), propylene carbonate, ethyl lactate, butyl lactate, methyl acetoacetate, ethyl acetoacetate, dibasic acid ester DBE, and 3-methyl-3-methoxybutyl acetate. An example of the pyrrolidones is N-methyl-2-pyrrolidone.

One selected from the exemplified organic solvents may be singly used, or two or more of them having different boiling points may be suitably combined and used in consideration of solubility of an infiltration-proof material to be used, discharge stability of the ink, and drying property of the ink on a target medium. Preferably, the content of the organic solvent in the solvent UV ink is equal to or greater than 50 wt. % and equal to or less than 99 wt. % of a total quantity of the ink composition.

[Pigment]

The pigment usable in the solvent UV ink may be one selected from the conventional pigments including black and color pigments. An example of the black pigments is carbon black. Examples of the color pigments include anthraquinones, phthalocyanine blues, phthalocyanine greens, diazos, monoazos, pyranthrones, perylenes, heterocyclic yellows, quinacridones, and (thio)indigoids. Any suitable one may be selected from these pigments or two or more of them may be combined, and then mixed with the ink. If a clear ink is desirably prepared and used as the solvent UV ink, the pigment is preferably not used. Preferably, the content of the pigment in the solvent UV ink is equal to or greater than 3 wt. % and equal to or less than 5 wt. % of a total quantity of the ink composition.

[Photopolymerization Initiator]

The photopolymerization initiator usable in the solvent UV ink is preferably a material capable of efficiently initiating polymerization of the resin of UV curing type in response to ultraviolet irradiation. Any suitable one selected from the conventional photopolymerization initiators may be used. Examples of the photopolymerization initiators include alkylphenone-based photopolymerization initiators, thioxanthone-based photopolymerization initiators, acyl phosphine oxide-based photopolymerization initiators, and titanocene-based photopolymerization initiators. Any suitable one may be selected from these photopolymerization initiators or two or more of them may be combined, and then mixed with the ink.

[Sensitizer]

The sensitizer usable in the solvent UV ink is preferably a material capable of efficiently initiating reactions of the photopolymerization initiator in response to ultraviolet irradiation. Any suitable one selected from the conventional sensitizers may be used. Examples of such a sensitizer include amines such as trimethylamine, methyldimethanolamine, triethanolamine, p-diethylaminoacetophenone, ethyl p-dimethylaminobenzoate, isoamyl p-dimethylaminobenzoate, and N,N-dimethylbenzylamine. Any suitable one may be selected from these examples of the sensitizer or two or more of them may be combined, and then mixed with the ink.

[Other Additives]

If necessary, the solvent UV ink may contain other additives in addition to the additives so far described, for example, a diluent, an anti-foaming agent, a pigment dispersant, a slipping agent, a leveling agent, and/or a polymerization inhibitor. Preferably, a summed content of the photopolymerization initiator and the other additives in the solvent UV ink is approximately 10 wt. % of a total quantity of the ink composition.

[Printing Target Object 1]

The printing target object on which the solvent UV ink layer 2 is formed may be any suitable one selected from a variety of different types of products. A particularly preferable example is fabric. The fabric is a fiber base material of woven fabric, knitted fabric, and unwoven fabric, for forming clothes such as T-shirts. The printing method according to this embodiment can provide a fabric printed product excellent in fastness to washing. In the printing method, therefore, clothes more desirably excellent in fastness to washing, such as T-shirts, are suitably used as the printing target object.

[Drying Step]

Figure 1B:
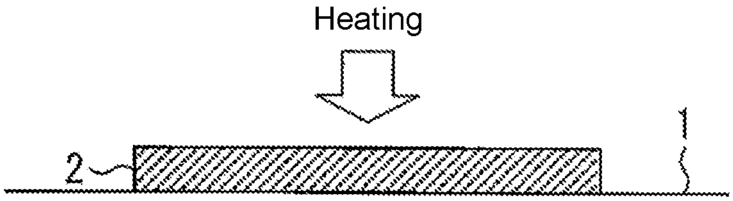

As illustrated in FIG. 1B, in the drying step, the solvent UV ink layer 2 formed on the printing target object 1 is dried. In the drying step, the solvent UV ink layer 2 is dried by, for example, heating the solvent UV ink layer 2 to volatilize the organic solvent contained in the solvent UV ink layer 2. FIG. 1B illustrates the solvent UV ink layer 2 is directly heated from the solvent UV ink layer 2 side, but it is not limited to this, the solvent UV ink layer 2 may be heated from the opposite side through the printing target object 1.

Optionally, in the drying step, the solvent UV ink layer 2 is preheated at a temperature between 40° C. and 60° C., the preheated solvent UV ink layer 2 is heated at a temperature between 35° C. and 55° C., and then the heated solvent UV ink layer 2 is post-heated at a temperature between 40° C. and 60° C. Preferably, the heating temperatures in the drying step are 60° C. for preheating, 55° C. for heating, and 60° C. for post-heating. By thus heating and drying the solvent UV ink layer 2 at the varying heating temperatures, the solvent UV ink layer 2 can be moderately dried to such an extent that fulfills the purposes; preventing smearing of the ink, and attaining a degree of viscosity that ensures enough stickiness for the solvent UV ink layer 2 to be decorated in the subsequent decorating step.

The length of drying time in the drying step may be suitably decided to impart a desired viscosity to the solvent UV ink layer 2.

Drying the solvent UV ink layer 2 in the drying step increases the viscosity of the solvent UV ink layer 2. This effectively prevents smearing of the solvent UV ink layer 2 on the printing target object 1, and further ensures a moderate degree of viscosity that allows the solvent UV ink layer 2 to be favorably decorated with the decorative material in the subsequent decorating step.

[Decorating Step]

Figure 1C:
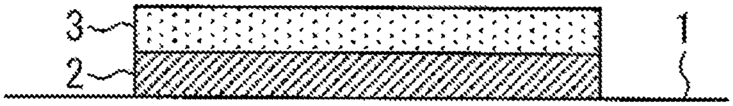

As illustrated in FIG. 1C, the decorating step makes the decorative material adhere to the dried solvent UV ink layer 2 or forms a decorative layer 3 containing the decorative material on the dried solvent UV ink layer 2. In the decorating step, the dried solvent UV ink layer 2 is decorated with the decorative material. The solvent UV ink layer 2, though increased in viscosity by drying, is still uncured, maintaining its stickiness. Therefore, an additional material, such as primer, is unnecessary to decorate the solvent UV ink layer 2.

The decorative material may be any suitable one selected from the known lacquerware materials for decoration purpose that can be sprinkled on and adhered to the solvent UV ink layer 2. Examples of such decorative materials include particles or fragments of materials such as pigments, metals, beads, gemstones (for example, pearl), and wool yarns. The decorative layer 3 containing the decorative material may be a metallic thin film such as a metallic foil, or a sheet containing particles or fragments of non-metal materials.

By decorating the solvent UV ink layer 2 with the decorative material in the decorating step, a printed product of a higher commercial value can be obtained.

[Curing Step]

Figure 1D:
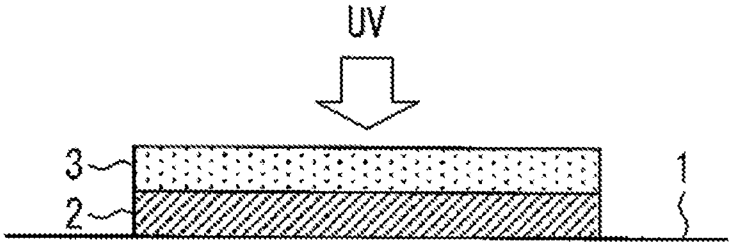

In the curing step, as illustrated in FIG. 1D, the solvent UV ink layer 2 decorated with the decorative layer 3 is cured by irradiating the same with ultraviolet (UV). As a result, a desired printed product can be obtained. The printed product thus obtained is excellent in fastness to washing, effectively preventing the printed pattern or decorative layer from fading or blurring even after repeated washes. This printing method is, therefore, advantageously suitable for printing patterns on clothes such as T-shirts desirably excellent in fastness to washing.

A conventional technique using, for example, LED or metal halide lamp, may be employed to irradiate the solvent UV ink layer 2 with ultraviolet. The wavelength of ultraviolet delivered on the solvent UV ink layer 2 is not particularly limited as far as the solvent UV ink layer 2 is adequately cured.

FIG. 1D illustrates the ultraviolet irradiation on the solvent UV ink layer 2 through the decorative layer 3 formed thereon, but the present invention is not limited to this. In the case where the printing target object 1 is an ultraviolet transmittable medium, ultraviolet may be delivered on the solvent UV ink layer 2 from the opposite side through the printing target object 1.

In the printed product after the curing step, urethane resin coating or doming, for example, may be applied to the decorative layer 3 to improve the decorative layer 3 in luster and weather resistance.

As described so far, the printing method according to the embodiment of the present invention can successfully produce a printed product less likely to smear, excellent in fastness to washing, and favorably decorated.

[Printed Product]

A printed product according to an embodiment of the prevent invention includes a solvent UV ink layer formed on a printing target object, wherein a decorative material is adhered to the solvent UV ink layer or a decorative layer containing the decorative material is formed on the solvent UV ink layer.

This embodiment of the printed product according to the present invention is effectuated by the printing method according to the present invention described earlier. For details of the embodiment of the printed product according to the present invention, the above description of the printing method according to the present invention may be referenced.

[Supplementary Notes]

The printing method includes a forming step of forming the solvent UV ink layer 2 on the printing target object 1, a drying step of drying the solvent UV ink layer 2, a decorating step of adhering the decorative material to the dried solvent UV ink layer 2 or forming the decorative layer 3 containing the decorative material on the dried solvent UV ink layer 2, and a curing step of curing the decorated solvent UV ink layer 2 by irradiating thereon ultraviolet.

According to the above configuration, the solvent UV ink layer 2 formed on the printing target object 1 is dried and then decorated. The solvent UV ink layer 2 is dried to volatilize the organic solvent contained in the solvent UV ink layer 2, thus increasing its viscosity. This effectively prevents smearing of the solvent UV ink layer 2.

The dried solvent UV ink layer 2 is then decorated in the decorating step. The dried solvent UV ink layer 2, though increased in viscosity by drying, is still uncured, maintaining its stickiness. In the decorating step, therefore, the decorative material or the decorative layer 3 containing the decorative material can be favorably securely adhered to the solvent UV ink layer 2. This makes it unnecessary to use an additional material, for example, primer, to adhere the decorative layer to the solvent UV ink layer 2.

Lastly, the decorated solvent UV ink layer 2 is cured by irradiating the same with ultraviolet to obtain a desired printed product. The printed product thus obtained is excellent in fastness to washing, effectively preventing the decorative layer or printed pattern from fading or blurring even after repeated washes. This printing method is, therefore, advantageously suitable for printing patterns on clothes such as T-shirts desirably excellent in fastness to washing.

In the drying step of the printing method, the solvent UV ink layer 2 is preheated at a temperature between 40° C. and 60° C., the preheated solvent UV ink layer is heated at a temperature between 35° C. and 55° C., and then the heated solvent UV ink layer is post-heated at a temperature between 40° C. and 60° C.

According to the above configuration, in the drying step, the solvent UV ink layer 2 is heated and thereby is dried. Specifically, the solvent UV ink layer 2 is heated in this step at different temperatures in stages; preheating at a temperature between 40° C. and 60° C., heating at a temperature between 35° C. and 55° C., and post-heating at a temperature between 40° C. and 60° C.

The solvent UV ink layer 2 can accordingly be prevented from smearing and dried at the same time to a degree of viscosity that ensures enough stickiness for the solvent UV ink layer 2 to be subsequently decorated.

The forming step of the printing method forms the solvent UV ink layer 2 from the solvent UV ink containing the resin of UV curing type and the organic solvent selected from the group consisting of ketones, alcohols, ethers, hydrocarbons, glycols, glycol ether acetates, glycol ethers, esters, and pyrrolidones.

According to the above configuration, the solvent UV ink layer 2 is formed from the solvent UV ink containing the resin of UV curing type and the organic solvent selected from the group consisting of ketones, alcohols, ethers, hydrocarbons, glycols, glycol ether acetates, glycol ethers, esters, and pyrrolidones. This allows the dried but still uncured solvent UV ink layer 2 to maintain a degree of stickiness necessary for the decorating process, while effectively preventing smearing of the solvent UV ink layer 2.

In the printing method, the solvent UV ink contains the organic solvent by a weight percent equal to or greater than 50 wt. % and equal to or less than 99 wt. % of a total quantity of the ink composition.

According to the above configuration, the solvent UV ink layer 2 is formed from the solvent UV ink containing the organic solvent by a weight percent equal to or greater than 50 wt. % and equal to or less than 99 wt. % of a total quantity of the ink composition. This allows the dried but still uncured solvent UV ink layer 2 to maintain a degree of stickiness necessary for the decorating process, while effectively preventing smearing of the solvent UV ink layer 2.

In the printing method, the printing target object 1 may be fabric, in which case a fabric printed product excellent in fastness to washing can be favorably obtained. This printing method is, therefore, advantageously suitable for printing patterns on clothes such as T-shirts desirably excellent in fastness to washing.

The printed product includes the solvent UV ink layer 2 formed on the printing target object 1, wherein the decorative material is adhered to the solvent UV ink layer 2 or the decorative layer 3 containing the decorative material is formed on the solvent UV ink layer 2.

According to the above configuration, the printed product has the solvent UV ink layer 2 formed in a desired shape by the solvent UV ink, and the solvent UV ink layer 2 is decorated with the decorative material. Such a printed product is advantageously less likely to smear, excellent in fastness to washing, and favorably decorated. Thus, a commercially valuable product printed with an elaborate pattern can be obtained.

The invention is not necessarily limited to each embodiment described so far and may be carried out in many other forms. The technical scope of the invention encompasses any modifications within the scope of the invention defined by the appended claims and embodiments obtained by variously combining the technical means disclosed herein.

INDUSTRIAL APPLICABILITY

The invention is advantageously applicable to printing techniques.

The invention claimed is:

1. A laminate forming system, comprising:
- a printing target object;
- a solvent ultraviolet (UV) ink, containing a resin of UV curing type and an solvent;
- an inkjet head, discharging the solvent UV ink by an inkjet method;
- a heating component, heating the printing target object;
- a UV irradiation apparatus, irradiating UV light which cures the resin of UV curing type;
- a decorative material; wherein
- an ink layer is formed on the printing target object by the inkjet head,
- the ink layer is heated by the heating component to volatilize the solvent to increase the viscosity of the ink layer, and
- the decorative material is adhered to the ink layer in which the viscosity is increased in a state of the resin of UV curing type is still uncured,
- the ink layer to which the decorative material is adhered is irradiated with the UV light from the UV irradiation apparatus, and the resin of UV curing type contained in the ink layer is cured.

2. The laminate forming system according to claim 1, wherein the decorative material is at least one of pigments, metals, beads, gemstones, wool yarns, metallic thin film, a sheet containing particles or fragments of non-metal materials.

3. The laminate forming system according to claim 1, wherein the viscosity of the ink layer after volatilizing the solvent is maintained a degree of viscosity necessary for adhering the decorative material while preventing smearing.

4. The laminate forming system according to claim 2, wherein the viscosity of the ink layer after volatilizing the solvent is maintained a degree of viscosity necessary for adhering the decorative material while preventing smearing.

5. The laminate forming system according to claim 1, wherein the heating component heats the ink layer in three stages to volatilize the solvent, and the three stages include preheating performed at a temperature between 40° C. and 60° C., heating performed at a temperature between 35° C. and 55° C. which is different from the temperature for preheating, and post-heating at a temperature between 40° C. and 60° C. which is different from the temperature for heating.

6. The laminate forming system according to claim 1, wherein the solvent is an organic solvent selected from a group consisting of ketones, alcohols, ethers, hydrocarbons, glycols, glycol ether acetates, glycol ethers, esters, and pyrrolidones.

7. The laminate forming system according to claim 1, wherein the solvent contains a weight percent equal to or greater than 50 wt. % and equal to or less than 99 wt. % of a total quantity composition of the solvent UV ink.

8. The laminate forming system according to claim 1, wherein the printing target object is fabric.

9. The laminate forming system according to claim 1, wherein the decorative material is coated or domed after the resin of UV curing type is cured.

10. The laminate forming system according to claim 1, wherein the irradiation of the UV light is irradiated through the printing target object from a side opposite to the ink layer of the printing target object.

* * * * *